(12) United States Patent
Bieber

(10) Patent No.: US 7,477,952 B2
(45) Date of Patent: Jan. 13, 2009

(54) METHOD AND DEVICE FOR DISPLAYING INFORMATION PERTAINING TO AN INSTALLATION PART OF AN INDUSTRIAL INSTALLATION ON A MOBILE DISPLAY

(75) Inventor: Juergen Bieber, Ettlingen (DE)

(73) Assignee: Siemens AG, Munich (DE)

( * ) Notice: Subject to any disclaimer, the term of this patent is extended or adjusted under 35 U.S.C. 154(b) by 374 days.

(21) Appl. No.: 10/788,473

(22) Filed: Mar. 1, 2004

(65) Prior Publication Data

US 2004/0227641 A1    Nov. 18, 2004

(30) Foreign Application Priority Data

Apr. 14, 2003    (DE) .............................. 103 17 139

(51) Int. Cl.
G05B 15/00    (2006.01)
G05B 19/18    (2006.01)
G06F 3/00    (2006.01)

(52) U.S. Cl. .............................. 700/83; 700/65; 710/15; 710/18; 710/20

(58) Field of Classification Search .................. 700/83, 700/65, 17, 264; 710/15, 1, 18, 20; 340/825, 340/825.72; 400/708; 709/246; 455/41.2, 455/412
See application file for complete search history.

(56) References Cited

U.S. PATENT DOCUMENTS

| | | | | |
|---|---|---|---|---|
| 5,879,092 A | * | 3/1999 | Brannan et al. | 400/708 |
| 5,963,145 A | * | 10/1999 | Escobosa | 340/825.72 |
| 6,167,464 A | * | 12/2000 | Kretschmann | 710/15 |
| 6,654,816 B1 | * | 11/2003 | Zaudtke et al. | 710/1 |
| 6,973,333 B1 | * | 12/2005 | O'Neil | 455/569.2 |
| 6,973,335 B2 | * | 12/2005 | Ganton | 455/573 |
| 6,973,356 B2 | * | 12/2005 | Bieber | 700/65 |
| 6,985,740 B2 | * | 1/2006 | Shyy et al. | 455/453 |
| 7,028,102 B1 | * | 4/2006 | Larsson et al. | 709/246 |
| 2002/0107586 A1 | | 8/2002 | Kreikerneier et al. | |
| 2002/0147003 A1 | * | 10/2002 | Tada et al. | 455/412 |
| 2004/0162027 A1 | * | 8/2004 | Chang | 455/41.2 |

FOREIGN PATENT DOCUMENTS

| | | |
|---|---|---|
| DE | 41 23 043 A1 | 1/1993 |
| EP | 0 846 991 A1 | 6/1998 |
| WO | WO 02/075466 A2 | 9/2002 |

OTHER PUBLICATIONS

Bluetooth—Wikipedia, http://en.wikipedia.org/wiki/Bluetooth, 14 pages.*

* cited by examiner

*Primary Examiner*—Albert DeCady
*Assistant Examiner*—Sunray R Chang
(74) *Attorney, Agent, or Firm*—Sughrue Mion, PLLC

(57) ABSTRACT

A method and a device for displaying information pertaining to an installation part of an industrial installation on a mobile display device. Each installation part of the industrial installation has a transmitter, which transmits a signal that identifies the installation part. This transmitted signal is received by a receiver of the mobile display device and is relayed to a central analysis station, which makes available information pertaining to the installation part and transmits such information back to the mobile display device, where video signals corresponding to the information sent back are displayed on a display. Preferably, all the aforementioned processes take place automatically as soon as the mobile display device is brought into the vicinity of the installation part.

20 Claims, 3 Drawing Sheets

4 Radio Receiver
5 Controller
6 Send and receive unit
8 Analysis station
9 Analysis station
10 Analysis station 4 Radio Receiver
5 Controller
6 Send and receive unit
8 Central Analysis station

| | |
|---|---|
| 4 | Radio Receiver |
| 5 | Controller |
| 6 | Send and receive unit |
| 8 | Analysis station |
| 9 | Analysis station |
| 10 | Analysis station |

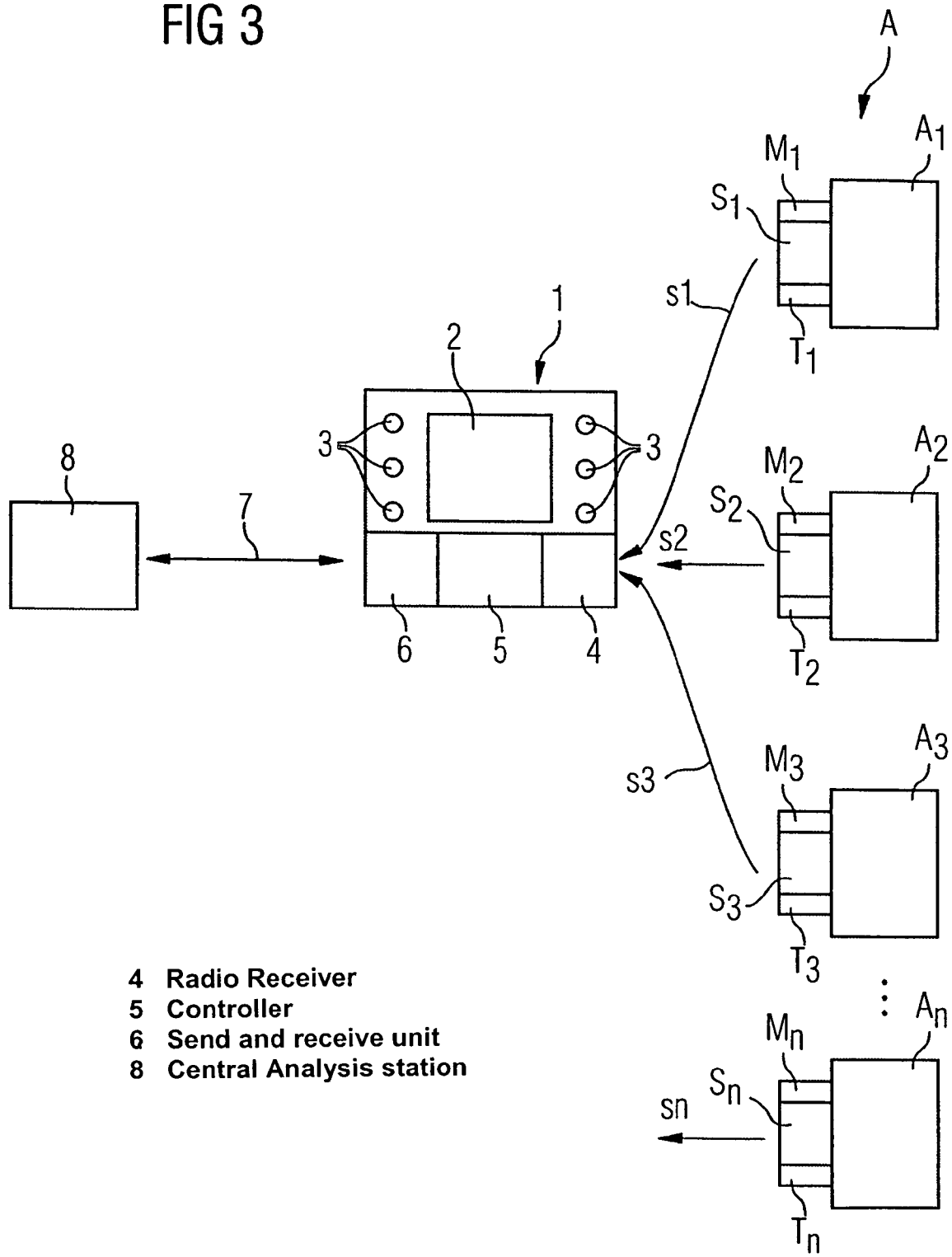

METHOD AND DEVICE FOR DISPLAYING INFORMATION PERTAINING TO AN INSTALLATION PART OF AN INDUSTRIAL INSTALLATION ON A MOBILE DISPLAY

The following disclosure is based on German Patent Application No. 10317139.8, filed on Apr. 14, 2003, which is incorporated into this application by reference in its entirety.

BACKGROUND OF THE INVENTION

The present invention relates to a method and a device for displaying information pertaining to an installation part of an industrial installation on a mobile display.

It is conventionally known that mobile display devices may be used in conjunction with industrial production and, specifically, with manufacturing installations, in which installation parts may be set up at locations that are far apart.

Such conventional mobile display devices have a display on which information regarding a particular installation part can be displayed in the form of images and alphanumeric data. This displayed information may also contain a detailed view of the installation part, alphanumeric information such as process data, instructions to an operator, and alarm information and curves pertaining to the installation part.

However, to arrive at this display of information, the operator must manually retrieve data pertaining to the particular installation part from a respective central analysis station. To do so, the operator must have knowledge of the structure of the entire industrial installation, which may also include a plurality of central analysis stations. On the basis of this structural knowledge, the operator must navigate in the database stored in the respective analysis station to arrive at the data pertaining to the desired installation part. Such navigation is both tedious and time consuming. In addition, it is disadvantageous that the operator is required to have knowledge about the structure of the industrial installation, in particular, knowledge about the design of the industrial installation and a visualized installation guide.

Such a scenario is described in WO 02/075466 A2, for example, which discusses the operation and/or observation of equipment monitoring an installation control system. As disclosed therein, the monitoring equipment has a control unit, on at least one separate operating unit that communicates with the monitoring equipment, which is connected to an installation. An additional function block is also provided, in particular, in the form of an additional program, as part of the monitoring equipment or a device connected to the monitoring equipment. The additional function block intervenes in communication between the monitoring unit or a monitoring function block on the one hand, and the connected operator units on the other hand, in the manner of an interface module. Specifically, the additional function block analyses the information directed to a connected operating unit and processes this information so that the information, which is then relayed, can be displayed directly by the respective operating unit in the manner of a terminal. The connection between a central operation and monitoring device and/or a server and the decentralized operating device (i.e., client computer) can be made by data lines that run together in a star pattern in the server, by a network having a ring structure, with each connected client computer having an individual address, by infrared or wireless interfaces, by a national data network, or by an internal data network, wherein the communication may also, if necessary, be carried across the oceans by satellite.

OBJECTS OF THE INVENTION

An object of the present invention is to avoid the disadvantages of conventional industrial installations described above.

SUMMARY OF THE INVENTION

This and other objects are achieved by a method of displaying a video signal on the display of a mobile display device, including: transmitting a signal which identifies an installation part of an industrial installation by a transmitter of the installation part; receiving the transmitted signal by a receiver of the mobile display device; automatically relaying the received signal, or a transmission signal derived from the received signal, by the mobile display device to an analysis station; the analysis station automatically transmitting information pertaining to the installation part to the mobile display device; and automatically displaying a video signal corresponding to the information pertaining to the installation part on the display of the mobile display device.

Further, this and other objects may be achieved by a device for displaying a video signal on the display of a mobile display device, including: a transmitter which is situated on an installation part of an industrial installation and is provided for transmitting a signal which identifies the installation part; a mobile display device comprising a display, a receiver, and a send and receive unit; and an analysis station; wherein the receiver is provided for receiving the signals transmitted by the transmitter of the installation part, wherein the send and receive unit is provided for automatically relaying the received signal, or a transmission signal derived from the received signal, to the analysis station; wherein the analysis station is provided for reception of the signal transmitted by the mobile display device, and for automatic transmission of the information pertaining to the installation part to the mobile display device, and wherein the send and receive unit of the mobile display device is provided for receiving the information transmitted by the analysis station, and the display is provided for displaying a video signal corresponding to the information pertaining to the installation part.

The advantages of the present invention comprise, in particular, that an operator automatically receives information which belongs to an installation part in or on which the operator is situated at the moment via a display and, in particular, as a video signal on the display of the mobile display device. This increases the convenience in operational, service, and diagnostic work in complex industrial installations. In particular, the condition of an installation part can be diagnosed quickly and accurately on-site. This diagnosis can also be performed by less-qualified personnel because, in contrast with conventional methods and devices, no tedious step-by-step retrieval of data from a central unit is necessary. Instead, the present invention permits direct insight from a mobile unit on-site into the information pertaining to the respective installation part, which is then displayed automatically as a result of the transmission of an identifying signal which identifies the installation part. If the identifying signals are transmitted in the form of radio signals, for instance, then the automatic display of the information pertaining to the installation part is initiated as soon as the operator, with his mobile display device, comes into the vicinity of the installation part.

Consistent with one illustrative and non-limiting embodiment of the present invention, the radio transmitter of the installation part transmits the radio signal identifying the installation part as a permanent pulsating signal.

Consistent with another illustrative and non-limiting embodiment of the present invention, the radio transmitter of the installation part emits the radio signal identifying the installation part only when there is a problem in the installation part. This avoids in an advantageous manner an unnecessarily large number of radio signals being emitted at the same time within one installation.

An advantageous refinement of the present invention comprises providing a first operating mode, in which the radio transmitter of the installation part issues a permanent and pulsating radio signal which identifies the installation part, and providing a second operating mode, in which the radio transmitter of the installation part emits the radio signal identifying the installation part only when there is a problem in the installation part, and providing an option for switching between the two aforementioned operating modes.

If there is overlapping in time due to transmission of radio signals of multiple installation parts, then different priorities are automatically assigned to the received signals in an advantageous manner consistent with another illustrative and non-limiting embodiment of the present invention. This assignment is advantageously configurable by the operator. For example, the operator has an opportunity to add additional information to the radio signal identifying the installation part, said additional information concerning, for example, signaling an emergency, signaling an error, or signaling a problem-free state, and assigning a higher priority to an emergency than to a simple error message, which in turn is assigned a higher priority than the problem-free state. Accordingly, if radio signals of different priorities arrive at the mobile display device at the same time, then the radio signal having the highest priority, or a transmission signal derived therefrom, is automatically relayed to the central analysis station first, which then automatically sends the information concerning the installation part that is transmitting the radio signal having the highest priority back to the mobile display device, so that the information concerning the installation part can be displayed on the display. Thus, a transmission of radio signals having a lower priority is postponed temporarily.

Consistent with another illustrative and non-limiting embodiment of the present invention, the operator is given an opportunity to perform a priority assignment on-site on the basis of a selection video signal that is displayed on the display of the mobile display device.

The advantages of a device consistent with another illustrative and non-limiting embodiment of the present invention include the fact that when there is a plurality of analysis stations, the operator need not concern himself about from which of these analysis stations the operator must retrieve the particular desired information.

Rather, the appropriate analysis station is recognized automatically by analysis of the radio signal transmitted at the time.

BRIEF DESCRIPTION OF THE DRAWINGS

Additional advantageous properties of the present invention are derived from the explanation of illustrative and non-limiting embodiments on the basis of the figures, in which:

FIG. 3 shows a block diagram of a device consistent with a third illustrative and non-limiting embodiment of the present invention.

DETAILED DESCRIPTION OF THE PREFERRED EMBODIMENTS

Figure 1:
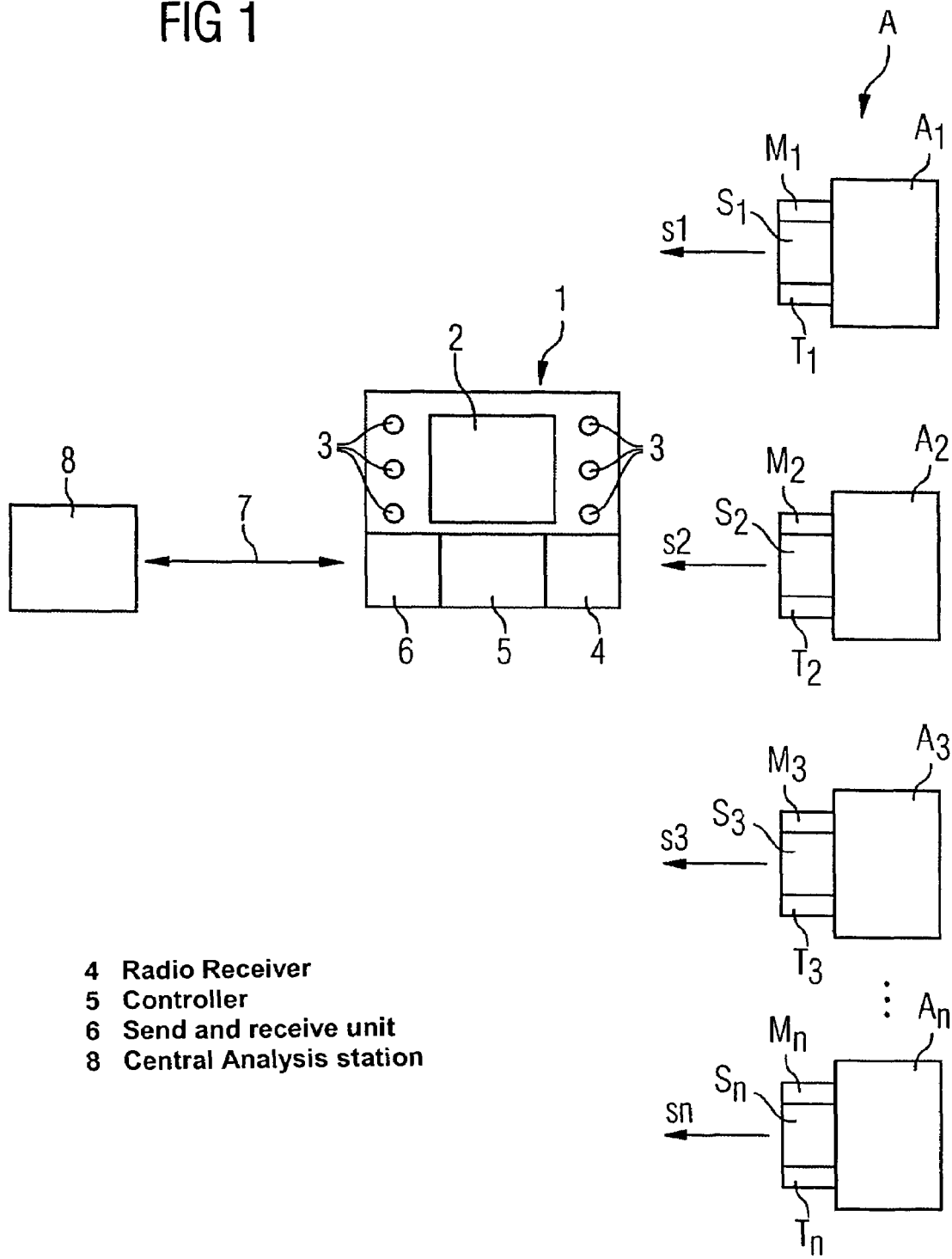
FIG. 1 shows a block diagram of a device consistent with a first illustrative and non-limiting embodiment of the present invention.

FIG. 1 shows a block diagram of a device consistent with a first illustrative and non-limiting embodiment of the present invention. The device shown in FIG. 1 has a central analysis station 8 in which all the essential data pertaining to an industrial installation A is stored. This essential data includes images of installation parts prepared as a part of the design phase and process data pertaining to the installation parts, which is sent to the central analysis station in the course of the process. The essential data also includes a location identifier, which individually identifies the particular installation part and describes the location of that installation part. Installation parts may include, for example, boilers, regulators and valves. An example of a location identifier is as follows:

"Boiler 22-Bier powder-Halle 22-sector 7-room 18-square C9."

The central analysis station 8 is connected to a mobile display device 1 by a transmission link 7. The transmission link 7 is a wireless transmission link over which signals can be transmitted for great distances. The mobile display device 1 is a small hand-held device, which may be operated while the device is being carried in the hand of an operator. For example, mobile display device 1 may comprise a so-called personal digital assistant ("PDA"), a cell phone, or a mobile industrial communicator. Mobile industrial communicators are available on the market by the present patent applicant under the trademark MOBIC® and are usually used in mobile applications for acquiring quality data, for inspection of spare parts lists, for visualizing process states, for acknowledging work orders, or for receiving detailed use plans.

The mobile display device 1 shown in FIG. 1 has a display 2, operating elements 3, a radio receiver 4, a controller 5, and a send and receive unit 6. The send and receive unit 6 is provided for the output of signals to the transmission link 7 and for reception of signals transmitted by the central analysis station 8 over the transmission link 7 to the mobile display device 1. The radio receiver 4 is used to receive signals transmitted by the radio transmitter of a radio module, which is set up in or on an installation part of an industrial installation A.

By way of example, the industrial installation A shown in FIG. 1 has installation parts $A_1 \ldots A_n$. A radio transmitter $S_1$ is provided for the installation part $A_1$, a radio transmitter $S_2$ is provided for the installation part $A_2$, a radio transmitter $S_3$ is provided for the installation part $A_3$ and a radio transmitter $S_n$ is provided for the installation part $A_n$. Each of these radio transmitters is part of a radio module. The radio transmitter $S_1$ transmits radio signals $s_1$. The radio transmitter $S_2$ transmits radio signals $s_2$. The radio transmitter $S_3$ transmits radio signals $S_3$, and the radio transmitter $S_n$ transmits radio signals $s_n$. The range of the radio signals transmitted by these radio transmitters is generally short, so the radio receiver 4 of the mobile display device 1 is generally able to receive the signals transmitted by a respective radio transmitter only when the mobile display device 1 is brought into the vicinity of a respective installation part.

In general, if an operator wanted to conduct on-site operation, maintenance, or inspection of the installation parts, then this operator would proceed with the mobile display device 1 to the immediate vicinity of the respective installation part. FIG. 1 shows the mobile display device 1 positioned in the immediate vicinity of the installation part $A_2$. In this position, the radio receiver 4 of the mobile display device 1 is capable of receiving the radio signals $S_2$ transmitted by the radio transmitter $S_2$. These radio signals $s_2$ identify the installation part $A_2$. Radio signals $s_2$ also contain a location identifier, which describes the location of the installation part $A_2$.

A radio signal received by the radio receiver 4, or a transmission signal derived therefrom, is forwarded by the send and receive unit 6 to the transmission link 7 and is relayed via transmission link 7 to the central analysis station 8. Central analysis station 8 recognizes, on the basis of the transmitted signal, that the mobile display device 1 is currently situated in proximity to the installation part $A_2$. Further, central analysis station 8 transmits information concerning the installation part $A_2$ back to the mobile display device 1 via the transmission link 7. The information transmitted by the central analysis station 8 concerning the respective installation part may include, for example, a graphic view of the respective installation part created as part of the design phase of the industrial installation, and/or alphanumeric data pertaining to the respective installation part, and/or current process data pertaining to the respective installation part, all of such data being available in the central analysis station 8. The information sent back by the central analysis station 8 via the transmission link 7 is received by the send and receive unit 6 of the mobile display device 1 and is then either displayed directly on the display 2 of the mobile display device 1, or is displayed on the display 2 after signal processing, if necessary.

All of the processes described above take place automatically as soon as the radio signal $s_2$ identifying the installation part $A_2$ is received by the radio receiver 4 of the mobile display device 1. Consequently, there is no need for an operator to perform a step-by-step retrieval of the information concerning the installation part $A_2$ by performing manipulations on the operating elements 3 of the mobile display device 1, or by navigating in a database stored in the central analysis station 8. In comparison with conventional methods, methods and devices consistent with the present invention constitute a great simplification for a respective operator. In particular, consistent with the present invention, the operator need not have any detailed knowledge of the overall layout of the industrial installation, nor does he need any detailed knowledge of the design phase of the industrial installation. Furthermore, the present invention saves time because the desired information in a procedure consistent with the present invention is displayed much more quickly on the display 2 than is the case with conventional methods.

Consistent with a first illustrative and non-limiting embodiment of the present invention, the radio transmitters $S_1 \ldots S_n$ constantly transmit their radio signals as pulsating signals. This has an advantage that the radio signals can be received at any point in time. All that is necessary is for the mobile display device 1 to be brought into the vicinity of a respective installation part.

Consistent with a second illustrative and non-limiting embodiment of the present invention, the radio transmitters $S_1 \ldots S_n$ transmit their radio signals only when there is a problem with respect to a respective installation part. For example, the central analysis station 8 may be notified of a problem by a sensor in an installation part. Because of this problem message, a service technician equipped with a mobile display device 1 may be sent to the installation part where the problem has occurred. As soon as the service technician is within the reception area of the radio signals identifying the installation part having the problem, these radio signals are received by the radio receiver 4 of the mobile display device 1. As a result of this, the respective information pertaining to the installation part having the problem is automatically displayed on the display 2 of the mobile display device 1. This information may include, for example, a graphic plot of the respective part of the installation and alphanumeric and/or visual instructions for the required procedure to eliminate the problem.

An advantage of the second embodiment, consistent with which the radio signals are transmitted only when there is a problem in an installation part is, in particular, the fact that an unnecessarily large number of broadcast signals are not transmitted within the industrial installation.

Figure 2:
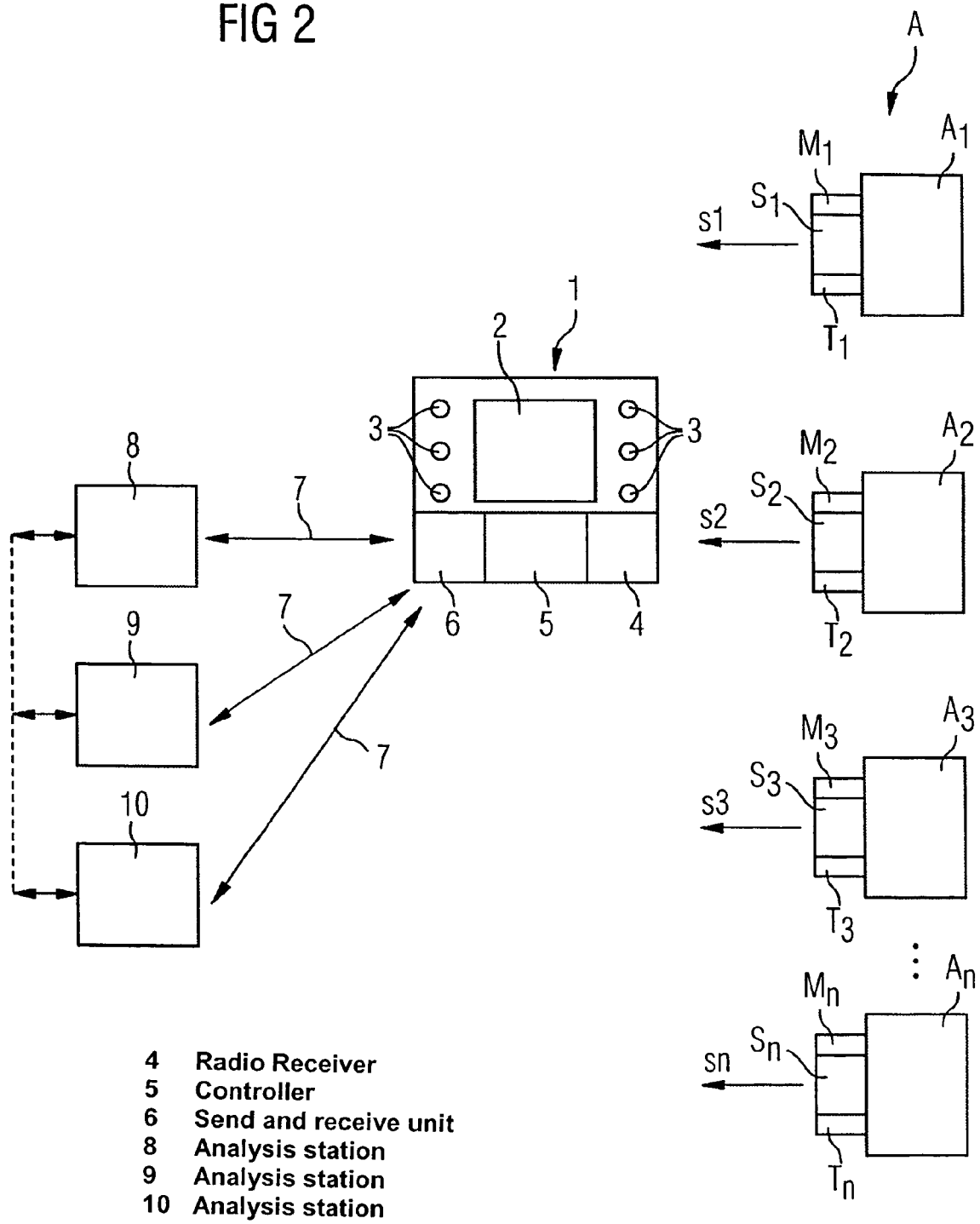
FIG. 2 shows a block diagram of a device consistent with a second illustrative and non-limiting embodiment of the present invention.

FIG. 2 shows a block diagram of a device consistent with a second illustrative and non-limiting embodiment of the present invention.

The device shown in FIG. 2 differs from the device depicted in FIG. 1 in that, in addition to an analysis station 8, it has other analysis stations 9 and 10, as is advantageous in large industrial installations for reasons of capacity. The analysis stations 8, 9, and 10 are interconnected, as indicated by the dotted line in FIG. 2. Consequently, there may be an exchange of data between the analysis stations, if necessary.

By way of example, as shown in FIG. 2, all of the essential data pertaining to the installation part $A_1$ of the industrial installation is stored in the analysis station 8. This essential data includes, for instance, a graphic view of the installation part $A_1$ created as part of the design phase, and/or process data pertaining to the installation part $A_1$, whereby this process data is sent to the analysis station 8 in the course of a process. The essential data may also include a location identifier, which individually identifies the installation part $A_1$ and describes the location of the installation part $A_1$.

As further shown in FIG. 2, all the essential data pertaining to the installation part $A_2$ of the industrial installation, for instance, is stored in the analysis station 9. This essential data includes, for example, a graphic view of the installation part $A_2$ prepared as part of the design phase, and/or process data pertaining to the installation part $A_2$, whereby this process data is sent to the analysis station 9 in the course of a process. The essential data may also include a location identifier, which individually identifies the installation part $A_2$ and describes the location of the installation $A_2$.

Additionally, as shown in FIG. 2, all the essential data pertaining to the installation parts $A_3 \ldots A_n$ may be stored in the analysis station 10. This essential data includes, for example, graphic views of the installation parts $A_3 \ldots A_n$ prepared as part of the design phase, and/or process data pertaining to the installation parts, whereby this process data is sent to the analysis station 10 in the course of a process. The essential data may also include a location identifier, which individually identifies each of the installation parts $A_3 \ldots A_n$ and describes the respective locations of the installation parts.

As shown in FIG. 2, the analysis stations 8, 9, and 10 are each connected to a mobile display device 1 via a transmission link 7. The transmission link 7 is, for example, a wireless transmission link via which signals can be transmitted over great distances. As in the illustrative and non-limiting embodiment according to FIG. 1, the mobile display device 1 is a small hand-held device, which may be operated while the device is being carried in the hand of an operator. The mobile display device shown in FIG. 2 comprises a display 2, operating elements 3, a radio receiver 4, a controller 5, and a send and receive unit 6. For the output of signals, the send and receive unit 6 is connected to one of the transmission links 7. Also, the send and receive unit 6 is provided for the reception of signals sent by one of the analysis stations 8, 9, or 10 via one of the transmission links 7 to the mobile display device 1. The radio receiver 4 is used for receiving signals transmitted by the radio transmitter of a respective radio module that is located in or on an installation part of an industrial installation A.

The layout of the industrial installation A according to FIG. 2 corresponds to the layout of the industrial installation A according to FIG. 1.

One difference between the device depicted in FIG. 2 and the device depicted in FIG. 1 is that the controller 5 depicted in FIG. 2 further comprises an analyzer unit which determines, on the basis of the particular radio signal received, in which of the analysis stations 8, 9, or 10 the information pertaining to the respective installation part that is transmitting the particular radio signal is available. Information of this sort is contained, for example, in the particular radio signal transmitted by the respective installation part. If the analyzer unit of controller 5 has determined the respective analysis station responsible, then it relays the received radio signal, or a transmission signal derived therefrom, to the respective analyzer station, thus determined, via the respective transmission link 7. The respective analyzer station then identifies, on the basis of the transmitted signal, the installation part that is transmitting the radio signal and sends the information pertaining to the respective installation part back to the mobile display device 1, via the respective transmission link 7, so that this information can be displayed on the display 2 of the mobile display device 1.

As an alternative to the embodiment described above, the mobile display device 1 may relay a received radio signal, or a signal derived therefrom, to an analysis station which, in the case where the desired information is available in one of the other analysis stations, retrieves the desired information from the respective other analysis station, and then transmits the desired information back to the mobile display device 1, on whose display the desired information is displayed.

Consequently, consistent with this illustrative and non-limiting embodiment, the required information is automatically retrieved from the respective analysis station. Accordingly, the operator does not require any information regarding in which particular analysis station the information pertaining to a certain installation part is available.

FIG. 3 shows a block diagram of a device consistent with a third illustrative and non-limiting embodiment of the present invention. The device depicted in FIG. 3 differs from the device depicted in FIG. 1 in that the installation parts $A_1$, $A_2$ and $A_3$ are arranged close together. As a result, the radio receiver 4 of the mobile display device 1 can receive radio signals transmitted by each of the radio transmitters $S_1$, $S_2$, and $S_3$ simultaneously.

To eliminate the problems associated with this, the controller 5 of the mobile display device 1 has a collision recognition component, which in the case of the reception of a plurality of different radio signals, automatically assigns different priorities to each of the received radio signals.

A first possibility for assigning priority consists of assigning different priorities to each of the individual installation parts. In the case of a collision of different radio signals, the highest priority is assigned to the radio signals transmitted by the installation part having the highest priority. The radio signals that are assigned the highest priority, or the signals derived therefrom, are first relayed to the central analysis station 8, which then sends the respective information to the mobile display device 1 for display on the display 2. Transmission of the signals having a lower priority is initially postponed and such lower priority signals are transmitted at a later point in time.

Another possibility for assigning priority is to transmit an additional identifier in each radio signal transmitted, such that the additional identifier provides information about the operating mode of the respective installation part. For example, such an additional identifier may contain information regarding whether an emergency has occurred in the respective installation part, whether a minor error has occurred in the respective installation part that should be eliminated occasionally, or whether the respective installation part is in a problem-free state. For instance, the highest priority is assigned to an emergency, a medium priority is assigned to an operating state involving an error, and a low priority is assigned to the problem-free state.

For example, if a radio signal indicating an emergency is transmitted by the installation part $A_3$, a radio signal indicating an error is transmitted by the installation part $A_2$, and a radio signal indicating a problem-free state is transmitted by the installation part $A_1$, then the collision recognition component of controller 5 will ensure that the radio signal indicating the emergency, or a transmission signal derived therefrom, will be the first radio signal to be relayed to the central analysis station 8. Thus, the central analysis station 8 first makes available information pertaining to the installation part $A_3$, and this information is transmitted back via the transmission link 7 to the mobile display device 1 and displayed on its display 2. The information displayed may contain a graphic representation of the installation part $A_3$ as well as alphanumeric instructions for eliminating the emergency. Transmission of signals having a lower priority is postponed at first and such lower priority signals are transmitted at a later point in time.

Consistent with an advantageous refinement of the present invention, the priority assignment described above can be configured by an operator by means of the operating elements 3 of the mobile display device 1. For example, the operator may modify, if necessary, a priority assignment made originally. If, for instance, during the operation of the industrial installation, it is determined that all the operating states of a certain installation part, which deviate from problem-free operation of that installation part, are to be observed with priority, then this circumstance may be taken into account by a modified priority assignment.

Another illustrative and non-limiting embodiment of the present invention consists of equipping the controller 5 of the mobile display device 1 with a collision recognition component, which in the event of the reception of a plurality of different radio signals, provides a selection video signal, which is displayed on the display 2. In the resulting display, the operator can select, by using the operating elements 3 of the mobile display device 1, one of the installation parts from which the colliding radio signals originate. If the operator has made this selection, then first the radio signal of the selected installation part, or a transmission signal derived from this radio signal, is relayed to the central analysis station 8, which then transmits the respective information back to the mobile display device 1 for display on the display 2. Transmission of the radio signals from the installation parts that are not selected is postponed for the time being and such radio signals are transmitted at a later point in time.

In the illustrative and non-limiting embodiments described above, the information identifying a particular installation part was transmitted as a radio signal to the mobile display device 1. Such wireless transmission is preferred because of the lower complexity and because of the high reception certainty. However, it is also possible to transmit the information identifying a particular installation part to the mobile display device 1 by some other method, e.g., as an infrared signal, or by using a cable. In the case of an infrared transmission, however, the reception certainty is reduced in comparison with a wireless transmission. Alternatively, in the case of a cable transmission, the display device and the particular installation part must be interconnected by a cable.

The above description of the illustrative and non-limiting embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method of displaying a video signal on the display of a mobile display device, comprising:
   transmitting a signal which identifies an installation part of an industrial installation by a transmitter of the installation part;
   receiving the transmitted signal by a receiver of the mobile display device,
   automatically relaying the received signal, or a transmission signal derived from the received signal, by the mobile display device to an analysis station;
   the analysis station automatically transmitting information pertaining to the installation part to the mobile display device; and
   automatically displaying a video signal corresponding to the information pertaining to the installation part on the display of the mobile display device,
   wherein, in the case of the contemporaneous reception of a plurality of different signals transmitted by different transmitters of different installation parts, different priorities are automatically assigned to each of the plurality of different signals.

2. The method as claimed in claim 1, wherein the signal identifying the installation part comprises a radio signal, and the radio signal is transmitted as a constant pulsating signal.

3. The method as claimed in claim 1, wherein the signal identifying the installation part comprises a radio signal, and the radio signal is transmitted only when there is a problem in the installation part.

4. The method as claimed in claim 1, wherein the different priorities are assigned according to a significance of faults ranking.

5. The method as claimed in claim 1, further comprising configuring by an operator priorities for said automatic assigning.

6. The method as claimed in claim 1, wherein the different priorities are assigned to the received signals only in the case of the contemporaneous reception of the plurality of different signals transmitted by the different transmitters of the different installation parts.

7. The method as claimed in claim 1, wherein which priority from the priorities to assign to a respective received signal is determined based on whether the respective received signal signals an emergency, signals an error, or signals a problem-free state.

8. A method of displaying a video signal on the display of a mobile display device, comprising:
   transmitting a signal which identifies an installation part of an industrial installation by a transmitter of the installation part;
   receiving the transmitted signal by a receiver of the mobile display device,
   automatically relaying the received signal, or a transmission signal derived from the received signal, by the mobile display device to an analysis station;
   the analysis station automatically transmitting information pertaining to the installation part to the mobile display device; and
   automatically displaying a video signal corresponding to the information pertaining to the installation part on the display of the mobile display device,
   wherein, in the case of the reception of a plurality of different signals transmitted by transmitters in different installation parts, different priorities are automatically assigned to the received signals, and
   wherein, in the case of the reception of a plurality of different signals transmitted by transmitters of different installation parts and contemporaneously received by the mobile display device, a selection video signal is automatically displayed on the display of the mobile display device and, on the basis of this selection video signal, an operator is able to select one of the installation parts from which the received signals originate, and the signal assigned to the selected installation part, or a transmission signal derived therefrom, is the first of the received signals that is relayed to the analysis station.

9. The method as claimed in claim 1, wherein an analysis station pertaining to the installation part transmitting the signal is determined in the mobile display device on the basis of the received signal, and the received signal, or a transmission signal derived from the received signal, is relayed to the analysis station thus determined.

10. A device for displaying a video signal on the display of a mobile display device, comprising:
   a transmitter which is situated on an installation part of an industrial installation and is provided for transmitting a signal which identifies the installation part;
   a mobile display device comprising a display, a receiver, and a send and receive unit; and
   an analysis station;
   wherein the receiver is provided for receiving the signals transmitted by the transmitter of the installation part,
   wherein the send and receive unit is provided for automatically relaying the received signal, or a transmission signal derived from the received signal, to the analysis station,
   wherein the analysis station is provided for reception of the signal transmitted by the mobile display device, and for automatic transmission of the information pertaining to the installation part to the mobile display device,
   wherein the send and receive unit of the mobile display device is provided for receiving the information transmitted by the analysis station and the display is provided for displaying a video signal corresponding to the information pertaining to the installation part, and
   wherein the mobile display device comprises a collision recognition component which, in the case of the contemporaneous reception of a plurality of different signals from different transmitters of different installation parts, automatically assigns a different priority to each of the plurality of different signals.

11. The device as claimed in claim 10, wherein the signal identifying the installation part comprises a radio signal and contains a location identifier that contains information regarding the location of the installation part in the industrial installation.

12. The device as claimed in claim 10, wherein the transmitter emits the signal constantly as a pulsating signal.

13. The device as claimed in claim 10, wherein the transmitter emits the signal only when it encounters a problem.

14. The device as claimed in claim 13, wherein the transmitter is part of a module and the module has an operating element by means of which the transmitter can be switched to different operating modes, wherein a first of the operating modes comprises a continuous pulsating transmission of the signal, and a second of the operating modes comprises a transmission of the signal only in the case when there is a problem.

15. The device as claimed in claim 10, wherein the mobile display device comprises operating elements by means of which the priority assignment can be configured.

16. The device as claimed in claim 10, wherein the mobile display device comprises an analyzer unit which determines, on the basis of the received signal, an analysis station pertaining to the installation part transmitting the signal, and wherein the send and receive unit of the mobile display device is provided to relay the signal, or a transmission signal derived therefrom, to the analysis station thus determined.

17. The device as claimed in claim 10, wherein the collision recognition component assigns the different priorities according to a significance of faults ranking.

18. The device as claimed in claim 10, wherein the collision recognition component assigns the different priorities only in the case of the contemporaneous reception of the plurality of different signals.

19. The device as claimed in claim 10, wherein which priority from the priorities to assign to a respective received signal is determined based on whether the respective received signal signals an emergency, signals an error, or signals a problem-free state.

20. A device for displaying a video signal on the display of a mobile display device, comprising:
 a transmitter which is situated on an installation part of an industrial installation and is provided for transmitting a signal which identifies the installation part;
 a mobile display device comprising a display, a receiver, and a send and receive unit; and
 an analysis station;
 wherein the receiver is provided for receiving the signals transmitted by the transmitter of the installation part,
 wherein the send and receive unit is provided for automatically relaying the received signal, or a transmission signal derived from the received signal, to the analysis station,
 wherein the analysis station is provided for reception of the signal transmitted by the mobile display device, and for automatic transmission of the information pertaining to the installation part to the mobile display device,
 wherein the send and receive unit of the mobile display device is provided for receiving the information transmitted by the analysis station and the display is provided for displaying a video signal corresponding to the information pertaining to the installation part,
 wherein the mobile display device comprises a collision recognition component which, in the case of the reception of a plurality of different signals, automatically assigns a different priority to each of the received signals, and
 wherein the mobile display device further comprises:
 a collision recognition component which, in the case of the reception of a plurality of different signals, provides a selection video signal which is displayed on the display; and
 operating elements by means of which one of the installation parts, from which the signals originate, can be selected on the basis of the selection video signal, wherein the send and receive unit of the mobile display device is provided to relay the signal assigned to the selected installation part, or a transmission signal derived therefrom, to the analysis station first.

* * * * *